April 29, 1941.  E. F. JUDD  2,239,849

VEHICLE AXLE

Filed Nov. 21, 1939  2 Sheets-Sheet 2

Inventor
ELROY F JUDD

By E. V. Hardway
Attorney

Patented Apr. 29, 1941

2,239,849

UNITED STATES PATENT OFFICE 2,239,849

VEHICLE AXLE

Elroy F. Judd, El Campo, Tex., assignor, by direct and mesne assignments, to T. E. Ferris, Harris County, Tex.

Application November 21, 1939, Serial No. 305,431

6 Claims. (Cl. 280—81)

This invention relates to a vehicle axle and has particular relation to an equalizing axle specially adapted for use on trailers, buses and other heavy vehicles, employing dual wheels.

An object of the invention is to provide an axle for mounting dual vehicle wheels in such manner that both wheels will at all times be in contact with the supporting surface, irrespective of the irregularities of said surface.

Heavy vehicles, such as buses, trailers and the like are commonly equipped with dual wheels, that is with two supporting wheels on each side. As at present constructed, the wheels of each pair are fixed relative to each other. Therefore, in case one of the wheels passes over an elevation, the other wheel of the pair will be out of contact with the supporting surface and the wheel passing over the elevation will carry the entire weight of the load intended to be carried by both, thus subjecting the tire to undue strain, often causing a blowout. It is the prime object of this invention to provide means for mounting the wheels, of each pair of dual wheels, in such manner that both wheels of the pair will be in constant contact with the supporting surface irrespective of the irregularities of the surface so that the two wheels will equally support the load intended to be carried by them.

It is another object of the invention to provide means for quickly and easily aligning the wheels in case they should get out of proper alignment.

With the above and other objects in view, the invention has particular relation to certain novel features of construction, operation and arrangement of parts, an example of which is given in this specification and illustrated in the accompanying drawings, wherein.

Referring now more particularly to the drawings wherein like numerals of reference designate similar parts in each of the figures, the numerals 1, 1 designate the side members of the framework or chassis of the vehicle and the numerals 2, 2 designate the side members of a sub-frame whose front and rear ends are connected by the front and rear cross rods 3, 4 thus forming an approximately rectangular sub-frame.

Figure 1:
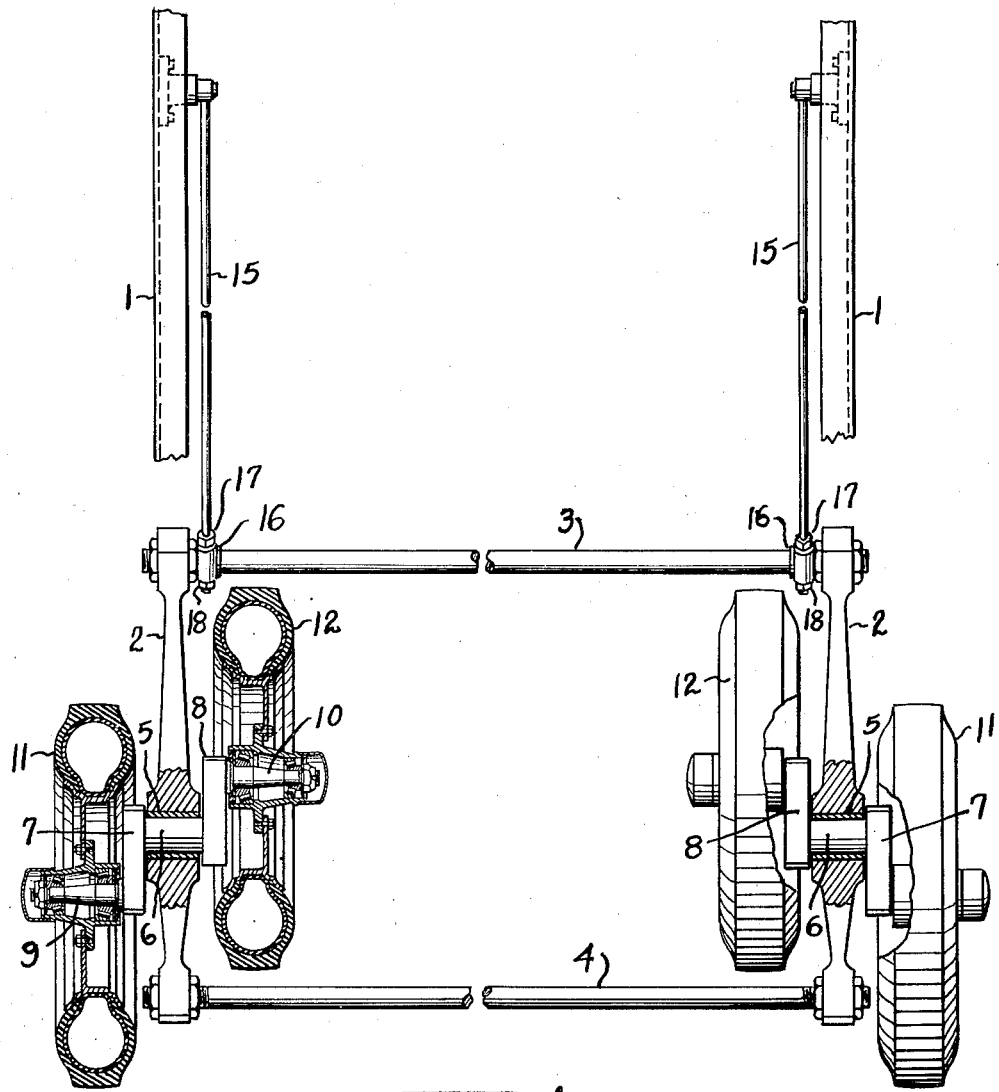
Figure 1 shows a fragmentary plan view of the vehicle shown partly in section.
Figure 2:
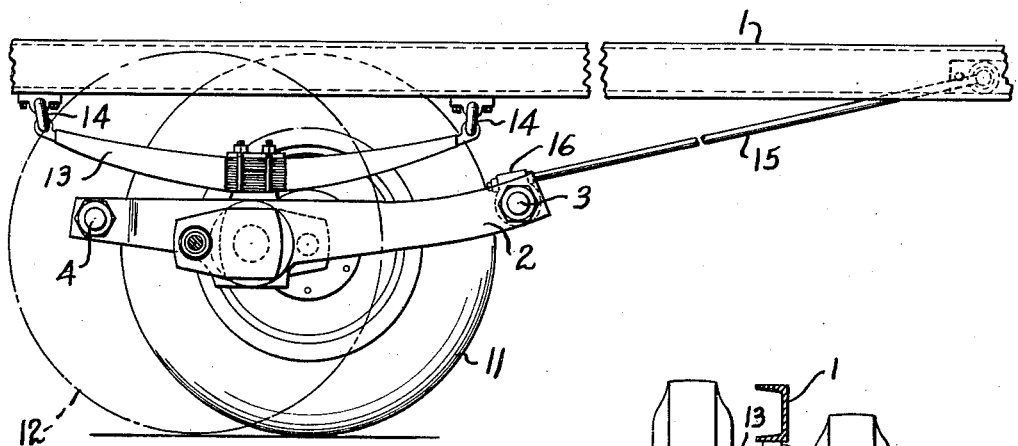
Figure 2 shows a fragmentary longitudinal sectional view.
Figure 4:
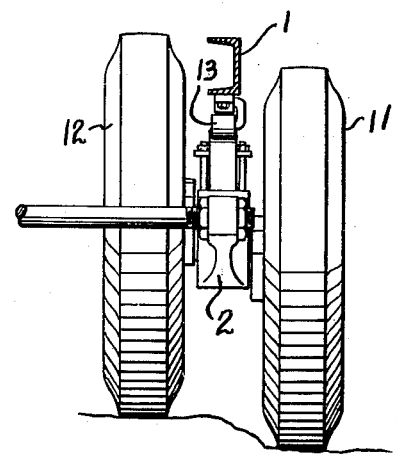
Figure 4 shows a fragmentary rear view.
Figure 3:
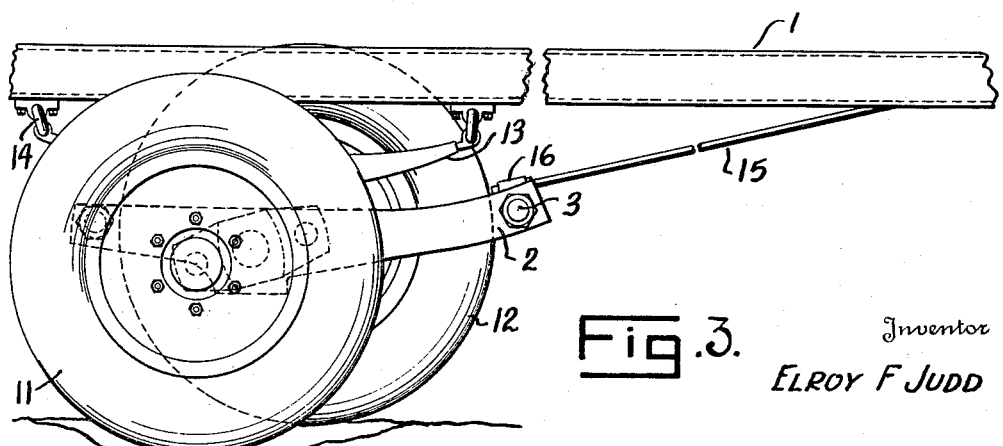
Figure 3 shows a fragmentary side elevation.

The side members 2 of the sub-frame have the transversely aligned bearings 5, 5 to receive the equalizing axles 6, 6. Each axle has the outer crank 7 and the inner crank 8 fixed on the respective ends thereof and oppositely directed and these respective cranks have the wheel spindles 9 and 10 thereon, the former extending outwardly and the latter extending inwardly and said spindles being in parallel relation. The outer and inner wheels 11, 12 of each pair are rotatably mounted on the spindles in any conventional manner. It is obvious, from the foregoing, that the wheels of a pair may move vertically relative to each other so as to accommodate themselves to uneven supporting surfaces as is clearly illustrated in Figures 3 and 4, to the end that the load carried by a pair of supporting wheels will be equally distributed between said wheels and the tires will not be subjected to excessive strains. Conventional leaf springs as 13, 13, are mounted on the respective side members 2 and secured thereto in a conventional manner to support the corresponding side members 1 of the main framework to which the ends of said springs are connected by the shackles 14.

The sub-frame is tied to the side members of the main chassis by the tie rods 15, 15. The forward ends of these rods are pivotally attached to the side members 1, 1. Their rear ends are fitted through bearings of the clamps 16 which clamps are mounted on the rod 3. The rear ends of the rods 15 are anchored to said clamps by means of the adjusting nuts 17, 18. These nuts may be adjusted as required so as to adjust the sub-frame into exact alignment with the main chassis to maintain the alignment of the supporting wheels 11, 12.

The drawings and description are illustrative merely while the broad principle of the invention will be defined by the appended claims.

What I claim is:

1. In a vehicle having a main frame, a sub-frame flexibly supporting a portion of the main frame and comprising a pair of rigid transversely interconnected longitudinal bars, one adjacent each side of the main frame, transverse bearings formed through said bars, a transverse short shaft journaled in each bearing and having forwardly and rearwardly offset crank arms, spindles on the ends of the arms, and wheels supporting said spindles.

2. In the combination defined in claim 1, leaf springs attached at their centers to the side bars adjacent said bearings, at least one of the ends of each spring being shackled to the main frame.

3. In a vehicle having a main frame, a rectangular subframe flexibly supporting said main frame, said subframe comprising a pair of widely spaced longitudinal members and a pair of transverse members adjustably connected at their ends to the longitudinal members, dual crank units mounted for oscillation on said longitudinal members about transverse axes, and wheels supporting the crank ends of said crank units.

4. In the combination set forth in claim 3, each front corner of the subframe being coupled to the main frame by means including swiveling connections.

5. In the combination defined in claim 3, the front corners of the subframe being coupled to the main frame by means capable of longitudinal adjustment.

6. In a vehicle having a main frame, a rectangular subframe below said main frame, and cushioning means disposed therebetween, said subframe comprising a pair of rigid longitudinal bars and a pair of rigid cross members adjustably interconnecting said bars to space them and prevent oscillation about their longitudinal axes, a dual crank unit adjacent each side of the vehicle each unit carrying a pair of wheels and journaled through one of the bars with capacity solely for oscillational movement in response to vertical wheel movements, and means connecting the subframe adjustably to the main frame with sufficient flexibility to permit tilting as well as vertical movement of the former relative to the latter.

ELROY F. JUDD.